(No Model.)
10 Sheets—Sheet 1.

F. HIRSCH.
MACHINE FOR LABELING CANS.

No. 360,694. Patented Apr. 5, 1887.

Witnesses:
Charles Selkirk
Alex. Selkirk Jr.

Fedor Hirsch
Inventor
per his Atty
Alex. Selkirk (No Model.)   10 Sheets—Sheet 3.

F. HIRSCH.
MACHINE FOR LABELING CANS.

No. 360,694.   Patented Apr. 5, 1887.

Fig. 3.

Witnesses:   Frodor Hirsch.
   Inventor.

(No Model.) 10 Sheets—Sheet 5.

F. HIRSCH.
MACHINE FOR LABELING CANS.

No. 360,694. Patented Apr. 5, 1887.

(No Model.)　　　　　　　　　　　　　　10 Sheets—Sheet 6.
F. HIRSCH.
MACHINE FOR LABELING CANS.

No. 360,694.　　　　　　　　　Patented Apr. 5, 1887.

Fig. 6.

(No Model.) 10 Sheets—Sheet 8.
F. HIRSCH.
MACHINE FOR LABELING CANS.

No. 360,694. Patented Apr. 5, 1887.

Fig. 8.

(No Model.) 10 Sheets—Sheet 9.

F. HIRSCH.
MACHINE FOR LABELING CANS.

No. 360,694. Patented Apr. 5, 1887.

(No Model.)  10 Sheets—Sheet 10.

F. HIRSCH.
MACHINE FOR LABELING CANS.

No. 360,694.  Patented Apr. 5, 1887.

Witnesses:
Charles Frederick
Alex. Selkirk Jr.

Fedor Hirsch
Inventor
per atty Alex. Selkirk

UNITED STATES PATENT OFFICE.

FEODOR HIRSCH, OF ALBANY, NEW YORK, ASSIGNOR OF FIVE-EIGHTHS TO ABRAHAM SCHELL AND CARL ROSELL, BOTH OF SAME PLACE.

MACHINE FOR LABELING CANS.

SPECIFICATION forming part of Letters Patent No. 360,694, dated April 5, 1887.

Application filed October 20, 1884. Serial No. 146,006. (No model.)

*To all whom it may concern:*

Be it known that I, FEODOR HIRSCH, a citizen of the United States, residing in the city and county of Albany and State of New York, have invented a new and Improved Machine for Labeling Cans, of which the following is a specification.

My invention relates to a new and improved machine for labeling cans in which, by successive operations of a series of mechanisms which are combined in the machine, a strip of paper will be printed in a continuous manner with proper label impressions or label matter, and be pasted and moved forward under tension to intermittently-revolving feed-rollers to a cutter and be cut into labels of dimension size in length, and apply such pieces as labels to the circumference of cans, which will be automatically introduced to the labels while said cans are revolved, and when the labels have been properly applied automatically deliver the cans from the machine.

My invention consists in the elements, devices, and parts, and the combinations of elements, devices, and parts hereinafter particularly described, and set forth in the claims.

The objects of my invention are, primarily, to produce a machine by the means of which successive progressive operations will be had with a paper strip, by successively operating mechanisms which will operate automatically and continuously with the same and such proper strip, while other mechanisms will operate automatically and simultaneously with the cans to be labeled, so as to finally apply the paper in the form of labels in a cemented manner to the cans and deliver the cans automatically from the machine; and, secondly, to provide specific mechanism, by which the invention may be made practical and operative for automatically printing labels, pasting and cutting the same to dimension size, and applying the same to the cans. I attain these objects by the means illustrated in the accompanying drawings, (in ten sheets,) forming a part of this specification, in which—

The same letters of reference refer to like parts throughout the several views.

A A is the frame of the machine, which frame is constructed in any proper manner for receiving the several parts and mechanisms employed.

A′, Figs. 1, 2, 3, 4, 5, 6, 7, and 9, is the main driving-shaft, (sometimes called the "cam-shaft,") having secured to it band-pulley $A^2$ and loose pulley $A^3$. To the opposite end of this shaft is the fixed pulley $A^4$.

B, Figs. 1, 2, 3, and 5, is a counter-shaft supported in proper bearings from the frame and having fixed to one end thereof driven pulley $b$, which is connected with pulley $A^4$ on shaft A. Secured also to this counter-shaft are driving-pulleys $b′$, (for communicating motion to the label-carrying mechanism,) $b^2$, (for communicating motion to the pasting mechanism,) and $b^3$, (for communicating motion to the can-revolving mechanism.)

C, Figs. 2, 3, 5, and 8, is the shaft of the paper roll C′, which shaft is supported in any proper bearings, so as to be readily removed at will. Secured to one end of this shaft is a friction-disk, $C^2$, provided with a set-screw, by which it is fixed to said shaft. $c$ is a brake-shoe fixed to an adjustable piece, $c'$, which can be set nearer to or farther from disk $C^2$ by an adjusting-screw, $c^2$, so as to cause the brake-shoe to bear with greater or less force on disk $C^2$, and thereby prevent shaft C from being too freely revolved. Situated at a short distance from the paper-roll shaft C, and forward of the same, is the label-printing mechanism, which will be hereinafter fully described. Situated above the same shaft C is the pasting mechanism by which the paper is pasted.

D, Figs. 1, 2, 3, and 5, is the paste-box, made with any proper form and supported by any proper brackets from the frame.

$D'$, Figs. 1, 2, 3, and 5, is a shaft arranged horizontally across and over the paste-box and supported from the frame in proper bearings, and is revolved by pulley $d$, driven by a belt from driving-pulley $b^2$ on counter shaft B.

$D^2$ is the paste-wheel, fixed on shaft $D'$ at about central in its length and between the sides of the paste-box. This paste-wheel I prefer to make of brass or other suitable material.

$D^3$ is a revolving paste-brush mounted on shaft $d^3$, provided with pulley $D^4$, driven by a band from grooved pulley $d'$. The bearings of this shaft $d^3$ are made with the free ends of arms $d^4$, and are secured to loosely-mounted shaft $d^5$, having bearings in the frame. The outer ends of arms $d^4$ are supported by adjustable connecting-bars $c^3$, Figs. 2 and 5, which are each provided with slot $c^3$ and set-screw $c^4$, for effecting a vertical adjustment of the same. The arms $d^4$ are provided each with a slot at its forward end, and are secured to shaft $d^5$ by set-screw $d^6$, working through said slots and screwing in shaft $d^5$, Fig. 1. By means of these arms $d^4$ and $c^3$ and their respective slots and set-screws, above described, the revolving paste-brush $D^3$ may be set nearer or farther from the periphery of the paste-wheel $D^2$, as the nature of the work to be done or the wear of the brush may require.

$D^5$ is the paste-dressing brush, mounted on shaft $d^7$, revolved by pulley $d^8$ from pulley $d^2$ on shaft $D'$. This shaft $d^7$ is mounted in bearings which are adjustable in a horizontal direction.

$D^6$, Figs. 1, 2, 3, 4, 5, 6, 7, and 8, is the paper-supporting wheel arranged so in relation to revolving brushes $D^3$ and $D^5$ that the latter will revolve against the periphery of the former, (or on the paper between said wheel and brushes.) This wheel $D^6$ is mounted on shaft $d^9$, supported in proper bearings from the frame, and is intended to support the paper while brushes $D^3$ and $D^5$ are operating with the paper to paste and dress the same, and co-operates with said brushes to move the paper forward while being brushed. The periphery of wheel $D^6$ is at a short distance from shaft $d^5$, so as to admit the passage of the paper strip P between them while it is being fed forward.

$D^7$, Figs. 1, 2, 3, 5, 6, and 7, is the paper-tension device, composed of arms $a\ a$, pivoted to the shaft of wheel $D^6$, and cross-bar $a'$, having a smooth face and secured to the free ends of said arms.

Figure 2:
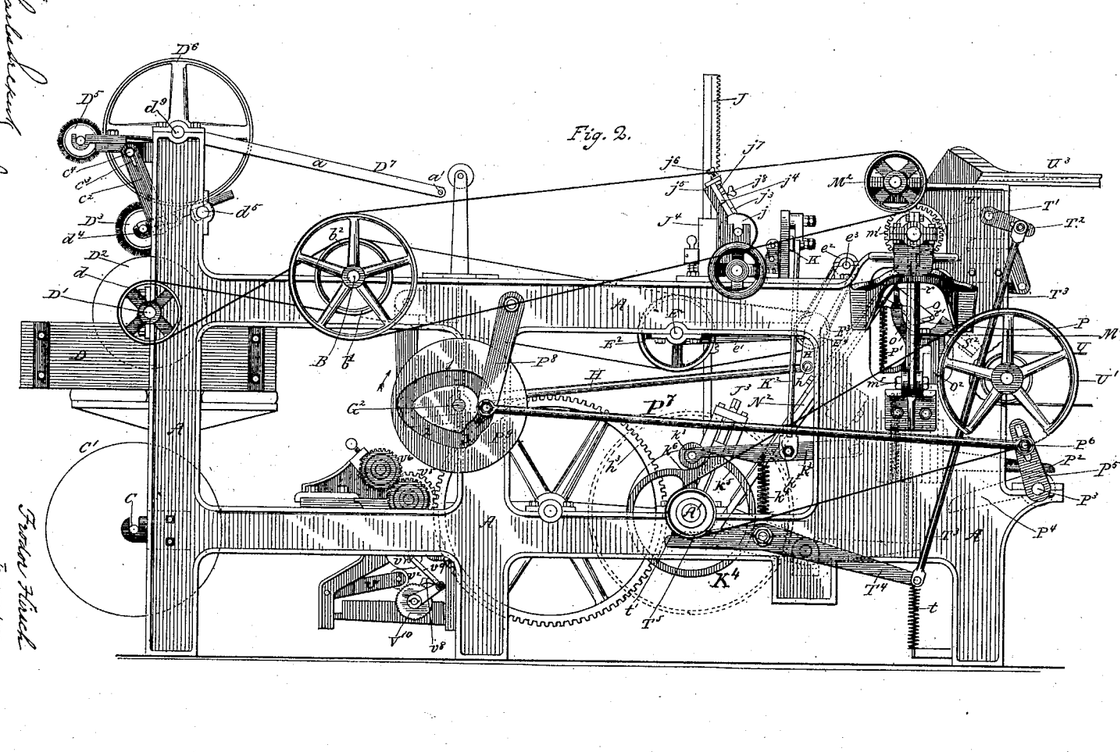
Fig. 2 is a side elevation, (right-hand side.)
Figure 3:
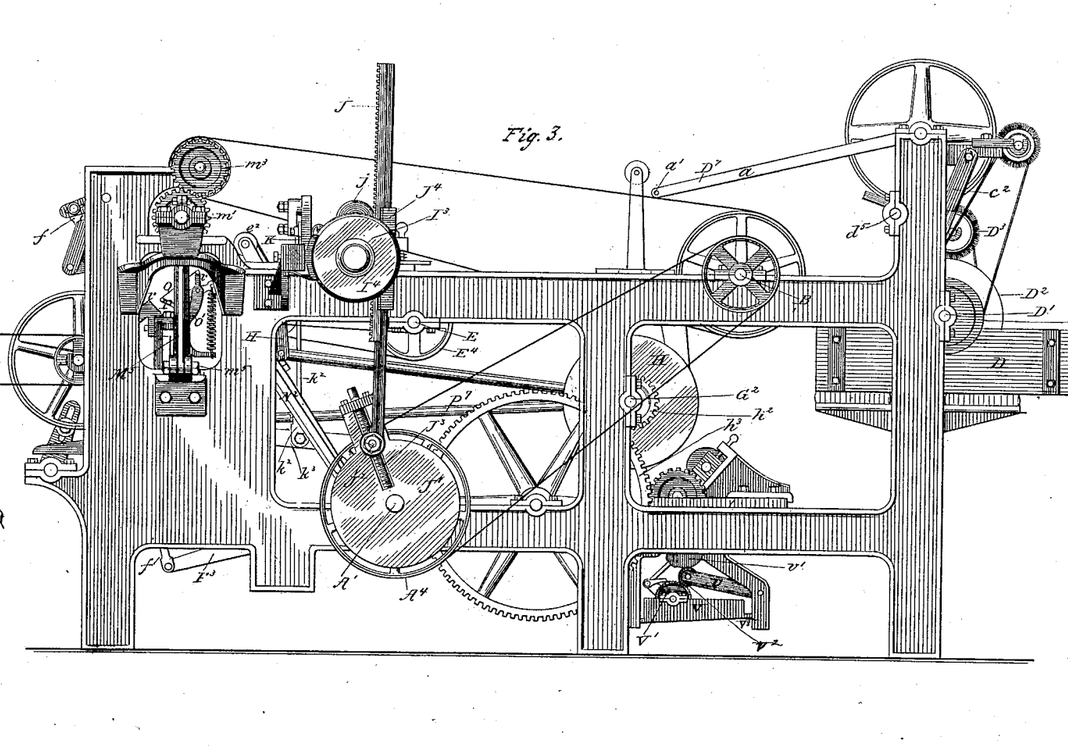
Fig. 3 is a side elevation, (left-hand side.)
Figure 7:
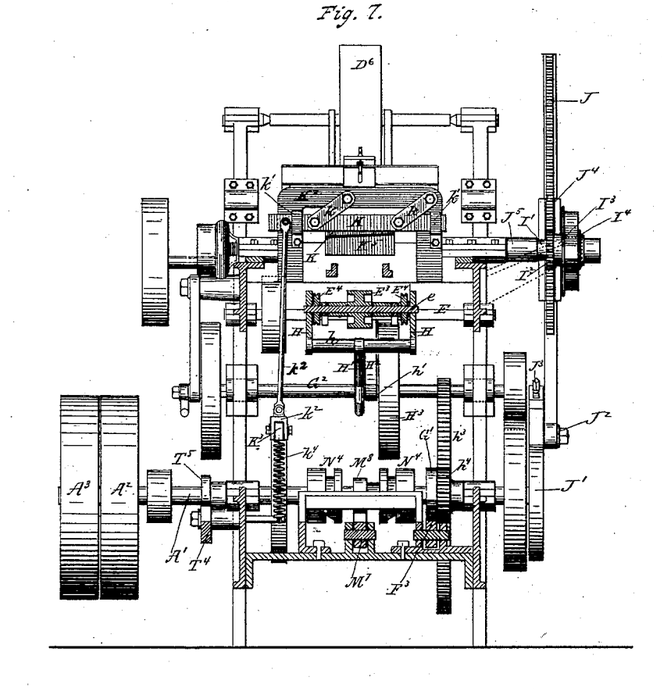
Fig. 7 is a transverse sectional view taken at line 3 in Fig. 5.
Figure 8:
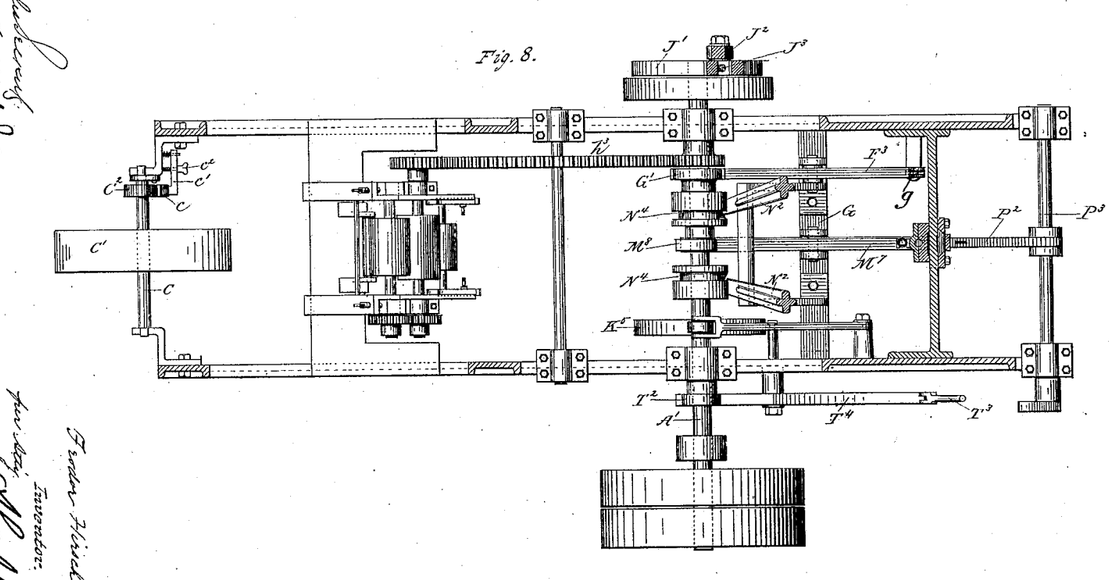
Fig. 8 is a horizontal sectional view taken at line 4 in Fig. 5.

E, Figs. 2, 3, and 7, is the driving-shaft of the label-applying mechanism, which shaft is supported in proper bearings from the frame.

Figure 1:
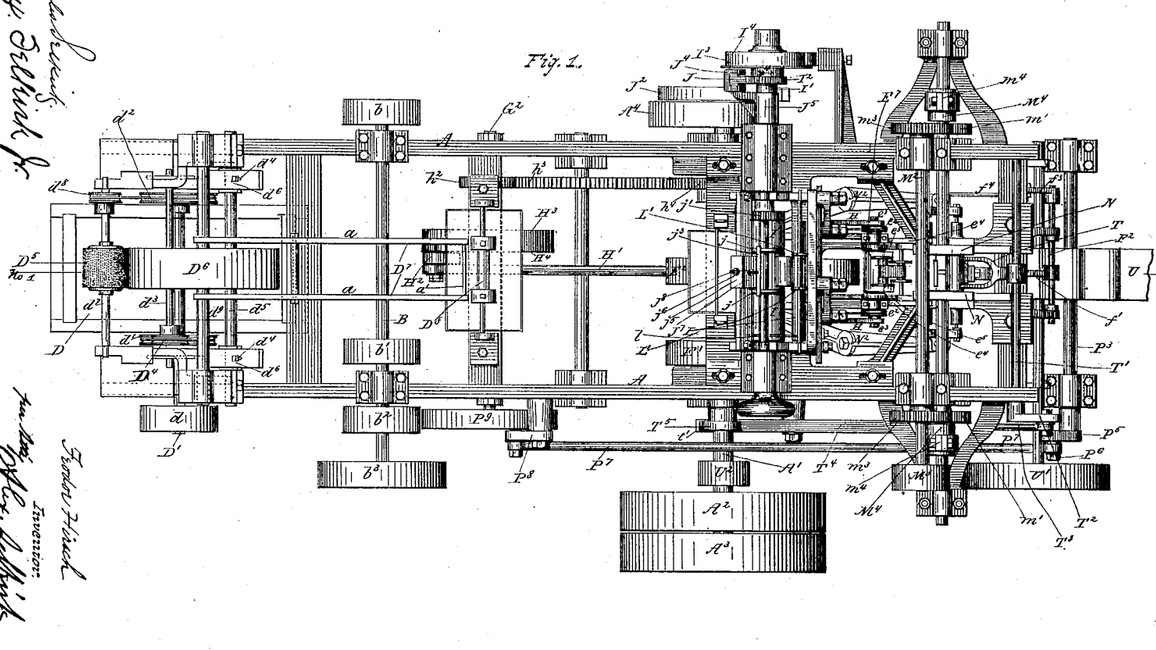
Figure 1 is a horizontal view of my can-labeling machine, taken from above.
Figure 5:
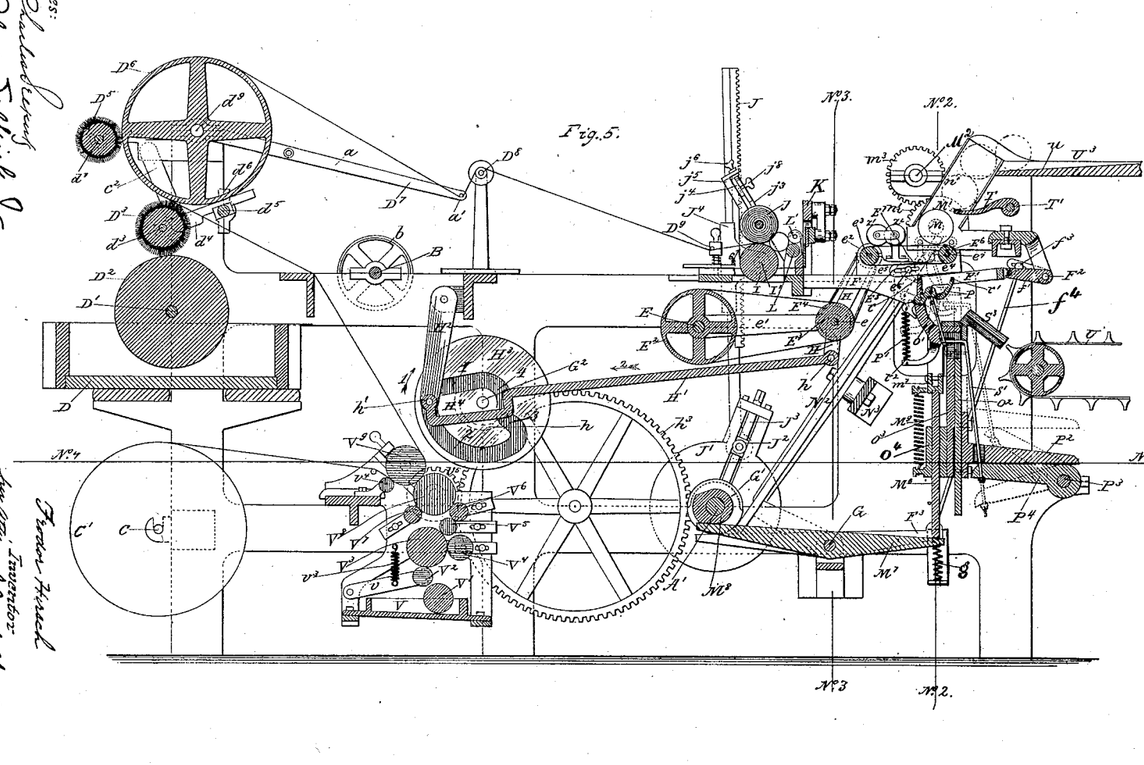
Fig. 5 is a sectional elevation taken at line 1 in Fig. 1.

$E'$, Fig. 1, is a pulley secured to said shaft and revolved by a belt connecting with pulley $b'$ on counter-shaft B. Secured to shaft E at about the middle of its length is pulley $E^2$, Figs. 1 and 5, which pulley is connected with pulley $E^3$ on shaft $e$ by a belt, and drives the revolving parts of the label applying mechanism, which is shown in Figs. 1 and 5 and illustrated on enlarged scale in Figs. 9, 10, and 11. Shaft $e$ has its bearings in the forward ends of links $e'\ e'$. (Shown in Figs. 9, 10, and 11.) These links are loosely connected with shaft E, Fig. 5, one at each side of pulley $E^2$. Mounted on shaft $e$, Figs. 9, 10, and 11, at each side of pulley E, are grooved pulleys $E^4\ E^4$, which revolve by means of band-pulleys $e^2\ e^2$, mounted on shaft $e^3$, which is supported in proper bearings in a movable carriage.

Figure 9:
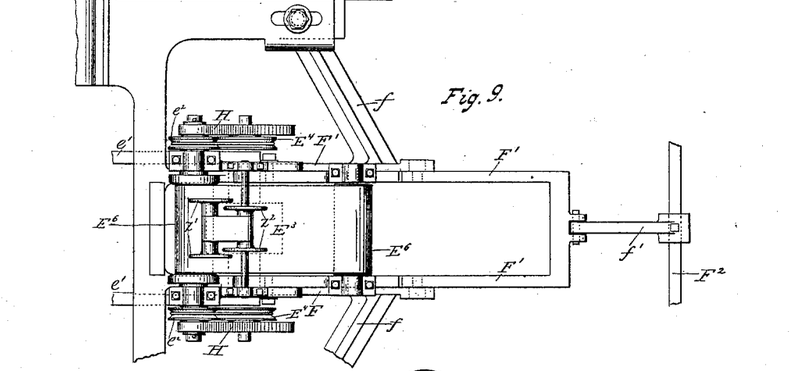
Fig. 9 is a plan view, on an enlarged scale, of the mechanism which carries the cut label from the knife to the can to be labeled.
Figure 10:
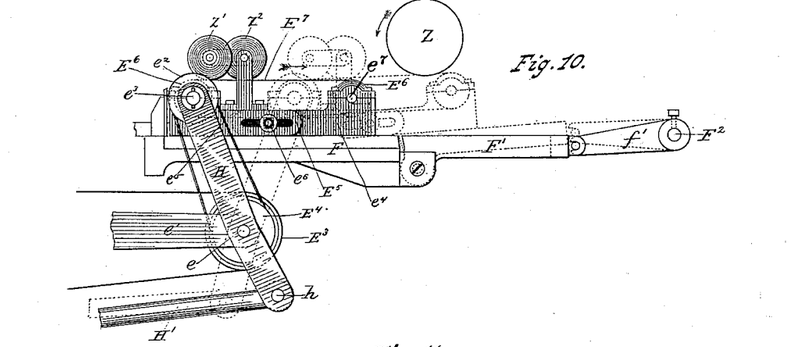
Fig. 10 is a side elevation of the same.
Figure 11:
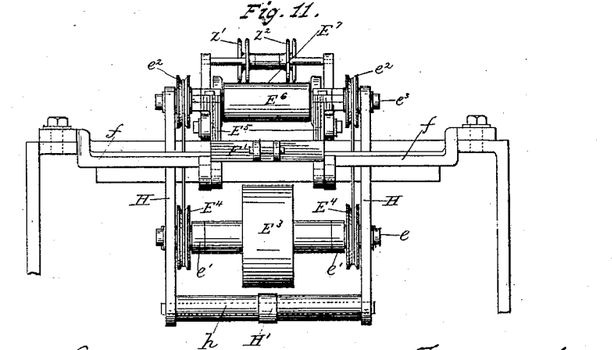
Fig. 11 is a front end elevation of the same.

$E^5$, Figs. 9, 10, and 11, is a movable carriage adapted to be moved in a reciprocating manner from the front of knife K forward, as indicated by dotted lines in Fig. 10, and thence back, as shown by full lines in the same figure, and also to have its forward end portion alternately raised and lowered, as will be hereinafter described. This movable carriage is composed of side pieces, $e^4\ e^4$ and $e^5\ e^5$. (Shown in Figs. 1 and 5 and illustrated on an enlarged scale in Figs. 9, 10, and 11.) One piece of each pair ($e^4\ e^5$) of these side pieces of said carriage is provided with a slot, and the other with a bolt-hole, through which bolt $e^6$ is passed to hold said pieces securely together. By means of said slots and the bolts, the sides of the movable carriage is rendered capable of being lengthened or shortened, to adapt it for use in applying labels of different lengths to cans of corresponding diameters.

$E^6$ is a roller mounted on shaft $e^7$, supported in bearings in the forward end of pieces $e^4$, and a second roller, $E^6$, is mounted on shaft $e^3$, and is connected with the forward roller, $E^6$, by the endless apron $E^7$. Motion communicated from pulleys $E^4\ E^4$ to pulleys $e^3\ e^3$ revolves the coacting rollers $E^6\ E^6$, moving the endless apron $E^7$. (Shown in Figs. 1 and 5 and on an enlarged scale in Figs. 9, 10, and 11.) This endless apron I denominate the "label-applying apron," which is revolved continuously. This movable carriage is properly supported and guided in its reciprocating movement by the jointed parallel ways F F' F F'. The rearward parts, F F, of these ways are rigidly secured to the frame-work by proper brackets, $f\ f$, and are relatively horizontal. The forward parts, F' F', are pivoted from their rear ends to the forward ends of pieces F F, and are adapted to have their forward ends alternately raised and lowered, as indicated by full and dotted lines in Fig. 10. The forward ends of pieces F' F' are connected together by a cross-piece, which is pivoted to arm $f'$, secured to rock-shaft $F^2$, as shown in Figs. 9 and 10, and also in Figs. 1, 4, and 5. This rock-shaft is supported in proper bearings and provided with slotted arms $f^3$, provided with an adjustable wrist-pin, to which is loosely connected the upper end of rod $f^4$. The lower end of connecting-rod $f^4$ is connected with the forward end of lever $F^3$, which has its fulcrum in cross-bar G. The rear end of lever $F^3$ has bearing against cam $G'$ on shaft $A'$, (the cam-shaft.) Spring $g$ connects the forward end of lever $F^3$ with any fixed piece attached to the frame, and holds the latter in constant contact with cam $G'$. This cam $G'$ and spring $g$ operate to vibrate lever $F^3$, and through connecting-rod $f^4$ and arm $f^3$ operate rock-shaft $F^2$, and thereby vibrate, through link $f'$, the portions $F'\ F'$ of the carriage-ways F F' in a vertical direction, so as to raise the forward end of carriage $E^5$, when it is being moved forward, to dotted lines in Fig. 10, and lower the same when it is being moved rearward to position of full lines in the same figure.

When carriage $E^5$ and its label-applying apron are carried forward to position of dotted lines in Fig. 10, the forward portions, $F'$, of the carriage-way will be elevated, as indicated, and so raise this apron as to be in contact with can Z as it is revolved in direction of arrow in Fig. 10; and when the said apron with its carriage is about to be moved rearward to the knife, and as shown by full lines in the same figure, the rock-shaft will operate to lower portions $F'$ of the way, and cause the endless apron to quickly drop down from contact with can Z.

The horizontal reciprocating movement of carriage $E^5$ and apron $E^7$ is effected by mechanism, as follows:

H H, Figs. 1, 2, 3, 4, 5, 6, and 7, and on an enlarged scale in Figs. 9, 10, and 11, are levers having their fulcrums on the ends of shaft $e$, which carry pulleys $E^3$ and $E^4\ E^4$, and which have bearings in the forward ends of links $e'\ e'$. The upper ends of these levers are pivoted to the ends of shaft $e^3$, carrying grooved pulleys $e^2\ e^2$ and $E^6$ of the label-applying apron $E^7$. The lower ends of these levers H are pivoted with shaft at $h$.

$H'$, Figs. 1 and 5, is a connecting-rod having its forward end pivoted to shaft $h$ and its rearward end to oscillating arm $H^2$, which is pivoted to any proper ear fixed to the frame. $h'$ is a roller loosely mounted on the pivot-pin which connects rod $H'$ with arm $H^2$.

$H^3$ is a circular disk mounted on shaft $G^2$. This disk $H^3$ has made in it the grooved cam $H^4$, in which roller $h'$ works as the said disk is revolved in direction of arrow 1. This cam $H^4$ has four operating-surfaces, against which roller $h'$ works. These surfaces are surface 1, which is made straight and operates to move rod $H'$ rearward; curved surface 2, for holding rod $H'$ rearward in an idle position; surface 3, for moving said rod quickly forward, and sharp curved surface for holding said rod forward in an idle position. It will be readily seen that by each revolution of cam $H^4$ each of these surfaces will operate once and successively to vibrate levers H H, with a short stoppage between each vibration, and give to the endless label-applying apron $E^7$ its horizontal reciprocating movement and stoppages.

Figure 6:
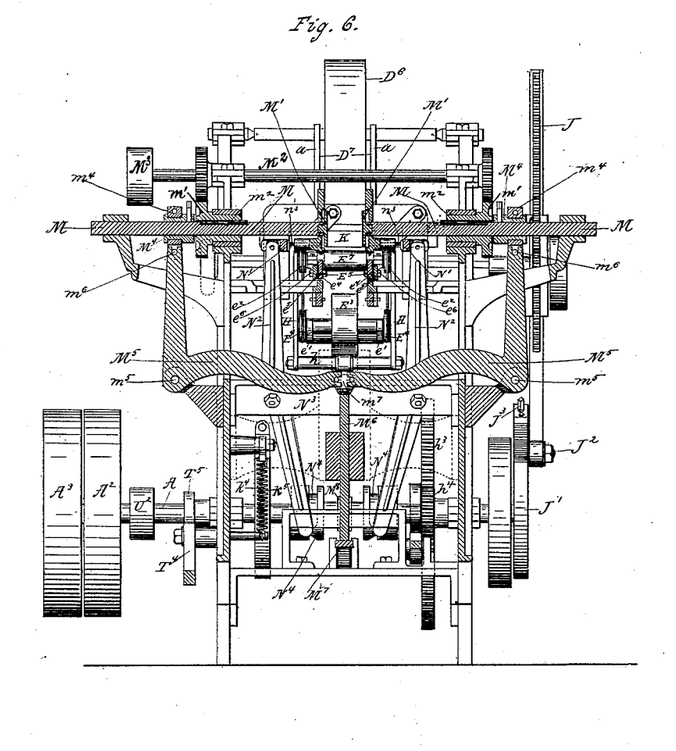
Fig. 6 is a transverse sectional view taken at line 2 in Fig. 5.

The movements of the surfaces 1, 2, 3, and 4 of cam $H^4$ are so timed in relation to the movement of the vertically-vibrating portions $F'$ of the way of carriage $E^5$, Fig. 6, that when surface 1 has thrown rod $H'$ back in direction of arrow 2 sufficiently to move said carriage and endless apron $E^7$ forward, so that its forward end is beneath the can, the throw-surface of cam $G'$ on shaft $A'$, Figs. 3, 4, 5, 7, and 8, will operate through lever $F^3$, rod $f^4$, and rock-shaft $F^2$ to move link $f'$ upward and raise the portions $F'$ of the carriage and throw the label applying apron up against the periphery of can Z, Fig. 10, when, by the further revolution of cam $H^4$, the curved surface 2 of the same will hold this apron up while it is being carried forward to its full distance as it is being revolved on its rollers. When surface 3 of said cam $H^4$ is about to carry said belt back, (through the above-described mechanism,) the depressed surface of cam $G'$ will operate to permit spring $g$ to draw (through lever $F^3$, rod $f^4$, rock-shaft $F^2$, and link $f'$) the forward ends of pieces $F'$ down and hold said pieces in a horizontal position until surface 3 of cam $H^4$ has operated to move said apron and its carriage back. The surface 4 of said cam will then operate to hold the mechanism between that cam and the apron-carriage temporarily idle, with said carriage and apron in situation at the front side of the cutter or knife.

Cam $H^4$ is revolved by pinion $h^2$, (secured to shaft $G^2$,) which is actuated by gear-wheel $h^3$, driven by pinion $h^4$, secured to shaft $A'$, Figs. 1, 3, 5, and 7.

Figures 12, 13, 14, 15, 16, 17:
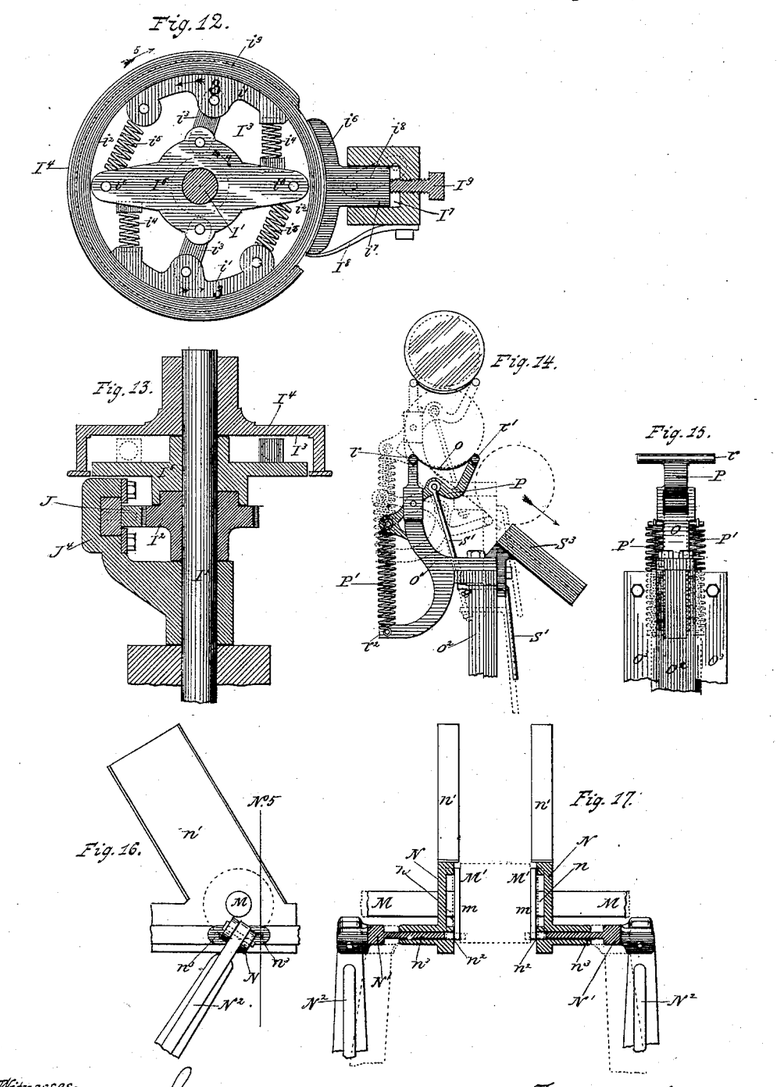
Fig. 12 is a plan view of the clutch mechanism $I^2$ on an enlarged scale.
Fig. 13 is a sectional elevation of clutch and feed mechanism operating the feed-roller to the knife.
Fig. 14 is a side elevation, on an enlarged scale, of the mechanism which operates to receive the cans after the label has been applied and deliver the same from the machine.
Fig. 15 is a front elevation of the same.
Fig. 16 is a side elevation, on an enlarged scale, of the mechanism operating to support the can while being centered between the can-revolving disks.
Fig. 17 is a sectional elevation of the same at line 5, Fig. 16.

I, Figs. 1, 3, and 5, is an intermittently-revolving feed-roller arranged rearward of knife or cutter K and forward of the tension device $D^7$. This roller I has its shaft $I'$ supported in proper bearings from the frame, and is revolved by the loose gear-pinion $I^2$, Figs. 1 and 13. This loose pinion $I^2$ is arranged with friction-clutch $I^3$, Figs. 1, 3, 4, 6, and 7. (Shown, also, in enlarged views, Figs. 12 and 13.) This friction-clutch is composed of disk $I^4$, firmly secured to shaft $I'$, friction shoes $i'\ i'$, fitted nicely to the internal surface, $i^2$, of said disk, plate $I^5$, secured to loose pinion $I^2$, pivoted arms $i^3$, connecting shoes $i'$ with plate $I^5$, and springs $i^4\ i^5$, between said plate and shoes, as shown in Fig. 12. It will be observed that springs $i^4$ exert a pushing force between arms $i^6$ of plate $I^5$ and the shoes, while springs $i^5$ exert a pulling force between the same, and that these two classes of springs co-operate to hold shoes $i'$ crowded outward against concave surface $i^2$, and with a tendency to move said shoes relatively in direction of arrows 3, Fig. 12. It will also be observed that arms $i^3$, in their pivoted connection with plate I⁵ and the shoes, are set relatively at an incline, so that the pivots connecting these shoes with the respective arms will be outward past a line drawn through the centers of the pivots which connect said arms with plate I⁵ and the center of shaft I'. In the relative arrangement of these parts, as above described, when plate I⁵ is moved with pinion I² (to which it is attached) in direction of arrow 4, such movement of plate I⁵ will operate with pivoted arms $i^3$ to force the shoes $i'$ outwardly against surface $i^2$, while at the same time springs $i^4$ $i^5$ will hold said shoes forward in direction of arrows 3 and effect a frictional bite of the shoes on friction-surface $i^2$, and cause disk I⁴ and shaft I' to revolve in the same direction as plate I⁵ and pinion I². It will therefore be readily seen that the revolution of pinion I² in direction of arrow 4, Fig. 12, will throw the shoes $i'$ in frictional engagement with the surface $i^2$ of disk I⁴ and cause said disk to be revolved in direction of arrow 5, Fig. 12, and revolve shaft I', with which it is fixed, in the same direction, and thereby revolve feed-roller I forward in direction of arrow 6, Fig. 5.

I⁶, Figs. 1, 3, and 12, is an external friction-shoe provided with arm $i^7$, held loosely in socket I⁷, secured by a bracket to the frame. This shoe is connected with the socket-piece by an obliquely-arranged link, $i^8$, (shown by dotted lines in Fig. 12,) which is provided at one end with the said shoe and at its opposite end with said socket-piece, as shown in the same figure. This obliquely-arranged link allows the arm of this shoe to work freely in either direction in the loosely-fitting socket I⁷. A spring, I⁸, is secured to the lower side of the socket-piece, with its free end bearing against the lower end of shoe I⁶, to hold the shoe up in position against the convex surface of disk I⁴. A set-screw, I⁹, works through the back wall of socket I⁷ and against arm $i^7$ of the shoe.

It will be observed that when the shoe is held up by spring I⁸, as shown in Fig. 12, there is between the lower side of arm $i^7$ of the shoe and the lower wall of socket I⁷ a small space, and that whenever this shoe-arm drops down to the lower wall of the socket, link $i^8$ will operate to draw this shoe back from contact with friction-surface $i^9$ of disk I⁴. It will also be understood that by means of set-screw I⁹ the distance said link will draw said shoe back from said friction-surface can be limited at will. With this form of construction and arrangement of the above-described parts this shoe will operate to instantly stop the revolution of disk 4 (forming part of clutch 3) at the instant pinion I² and plate I⁵ cease to be revolved in direction of arrow 4, Fig. 12, as this shoe I⁶ will operate instantaneously to check all movement of disk I⁴ in direction opposite to that of arrow 5, while it will readily permit the disk to revolve in direction of arrow 5, as the movement of the disk in that direction tends to carry shoe I⁶ downward when spring I⁸ will yield and link $i^8$ will draw the shoe back to the limit permitted by set-screw I⁹.

J, Figs. 1, 2, 3, 4, 5, 6, 7, and 13, is a toothed rack, which is operated in a reciprocating manner by the revolving crank-disk J' in same figures. This disk is provided with an adjustable wrist-pin, J², which can be set nearer to or farther from the center of motion of said disk by means of the adjusting-screw J³, accordingly as the length of movement of the rack is required to turn the feed-roller I to a distance equal to the length of paper desired to be fed forward to cutter K. When the wrist-pin J² is set nearest to the center of disk J' the length of stroke of toothed rack J will be shortest, and when set to the greatest distance from this center the length of said stroke will be the greatest, and the distance of revolution of the feed-roller will be greater or less, accordingly as the length of the movement of the rack is increased or lessened.

J⁴, Figs. 1, 2, 3, 4, 6, and 13, is a rocking guide or way pivoted to bearing or sleeve J⁵, loosely mounted on shaft I' of the feed-roller I. This guide holds toothed rack J and guides it in its movements, and holds the same in engagement with pinion I², to revolve it in alternate directions, in direction of arrow 4, Figs. 1 and 12, to hold with the friction-clutch, and through it revolve the feed-roller, and in a reverse direction, when it will be out of engagement with said clutch and revolve loosely on the shaft of said roller without affecting the feed roller.

Pinion $h^2$ on shaft G² is of the same diameter as pinion $h^4$ on shaft A'. It will therefore be seen that the revolutions of shafts $h^2$ and $h^4$ will be in equal time, so that disk J' and disk H³ of cam H⁴ will be revolved uniformly the same. This equal revolution of disk J' with cam H⁴ will operate to cause the toothed rack J, through pinion I² and its clutch, to revolve feed-roller I (while said rack is being moved upward) to carry forward a length of paper to equal the circumference of the can plus the length of laps of ends of the same, (the feed having been regulated previously by the distance of wrist-pin J² from the center of disk J'.) The upward movement of this toothed rack J is so timed with the movement of the label-applying apron-carriage E⁴ that said rack will only begin to revolve feed-roller I when that carriage has been brought back to the front of knife K, with the apron E⁷ in position to receive the same as it (the toothed rack) begins its operations to revolve the feed-roller I, and the downward or return movement of rack J will commence as soon as the length of paper for a label has been fully fed forward. In the upward movement of rack J the internal friction-shoes, $i'$, (for holding pinion I² with friction-clutch I³,) will operate through said clutch to revolve the feed-roller, while in the downward movement of said rack said shoes will cease to operate, and the exterior shoe, I⁶, will hold, with disk I⁴, to prevent its turning back, so that the reversed revolution of pinion I² on the shaft of the feed-roller will not in the least affect said roller.

$j\ j$, Figs. 1, 2, and 5, are pinching-rollers mounted on a shaft supported in notch-bearings made with proper brackets secured to the frame. These pinching-rollers are each made with a narrow convex form of face, and have bearing on feed-roller I, (or on the paper on said roller,) and are positively revolved by gears $j'$, actuated by gears mounted on shaft I' of the feed-roller I. The pasted paper P is passed between these pinching-rollers and the feed-roller, as shown in Fig. 5, and the pinch of the former rollers is regulated by the adjustable pressing-block $j^3$, Fig. 5, which is attached to the vertically-moving plate $j^4$, supported on horizontal bar $j^5$ by means of an adjusting-screw, $j^6$, screwing into said plate and working loosely in keeper $j^7$, Fig. 1, held to the bar $j^5$ by set-screw $j^8$, which set-screw works into said keeper and into a slot made in plate $j^4$.

At each stoppage of the revolution of feed-roller I the pinching-rollers $j\ j$ will also cease to operate, and will coact through the gears $j'$ with the feed-roller to hold the paper from being drawn back when tension device D⁷ is pressing down on the paper strip P.

L, Figs. 1 and 5, is a roller arranged in front of feed-roller I, for supporting the forward end of the paper after a label has been cut from strip P. This roller is revolved by band $l$, running in a groove made in the end portion of feed-roller I, and has its bearing in brackets supported from the frame.

L' L' are a pair of pressing-rollers mounted on a shaft revolving in notch-bearings. These rollers rest on supporting-roller L, (or the paper between.) The faces of these rollers are made with sharp convex surfaces, so as to have only a line-like thread bearing on the pasted paper, and serve to hold the paper down on supporting-roller L below, after the knife has been operated to cut off a label.

K, Figs. 1, 2, 3, 5, and 7, is the knife, which is secured to knife-bar K', supported from the knife-frame K² by vibrating connecting-bars $k\ k$, Fig. 7, which are arranged at like angles in relation to the knife. One end of each of these arms $k$ is pivoted to the knife-frame and the opposite end to the knife-bar to which knife K is attached, as shown. The knife secured to its bar is held close to the frame by keepers $k'\ k'$, Fig. 7. These keepers are secured to the frame by any proper fastenings, and preferably by bolts, and have their upper end portions forced against the front side of the knife-bar K by elastic pieces (preferably rubber) between the lower ends of said keepers and knife-frame.

K³, Figs. 2, 3, and 7, is a connecting-rod pivoted to the knife-bar, with its lower end pivoted to lever K⁴ by a double-joint connection, $k^2$, Fig. 7, or equivalent joint-connection, which will relieve the connection-rod from transverse strain. This lever K⁴ is pivoted to any proper bracket attached to the frame, and has its free end provided with roller $k^3$, Fig. 2, and is provided with spring $k^4$, which connects with a piece fixed to the frame.

K⁵ is a cam secured to shaft A'. This cam is circular in its major portion $k^6$ and runs back to the line of the same, as shown. This major portion $k^6$ of the periphery of the cam operates with roller $k^3$ to elevate and hold up the free end of lever K⁴ and force rod K³ upward, and thereby raise knife K and bring it in position ready for cutting. The concave portion $k^6$ of the cam permits roller $k^3$ of the lever to descend, when spring $k^4$ will draw down on said lever, and through rod K³ draw the knife-bar and its knife suddenly downward, when the vibrating bars $k\ k$ will operate to guide the knife in an endwise-swinging movement while descending and cause it to have a draw form of cut.

K⁶ is the stationary knife secured to a piece fixed to the frame, and has its upper edge made on a horizontal line in relation to roller L, Figs. 1 and 5. The cutting-edge of moving knife K is made on a slightly-inclined horizontal line in relation of the line of cutting-edge of the stationary knife, so that when knife K is moved it will cut with a swinging form of cut as it is drawn downwardly and endwise by the operation of connecting-rod K³ and bars $k\ k$, and start the cutting of the paper at the end of the stationary knife from which the moving knife swings and finish at the opposite end. By this peculiar feature in the operations of the moving knife the paper will not be in the least disturbed or moved from its line of original lay on the label-applying belt while it is being cut.

The cutting operation of the knife is so timed in relation to the operations of the feed-roller I and the longitudinal movement of the label-applying apron E⁷ that the knife will be made to descend the instant the forward revolution of the feed-roller has stopped and at the moment the carriage carrying the label-applying apron is about to start forward.

M M, Figs. 5, 6, and 17, are the can-revolving shafts, which are supported in proper bearings from the frame, and are each provided on their inner ends with can-holding disks M', which have rubber or other elastic facing-pieces $m$, Fig. 17. These shafts M are free to revolve and to be moved endwise, and are each revolved by loose gears $m'$, Figs. 1, 2, 3, 4, and 6, provided with journals held in proper bearings, $m^2$, Fig. 6, with the frame, and holding with said shafts M by a feather or spline, as in the practice of the trade, so that said shaft will be revolved when it is being moved endwise in either direction. These gears $m'$ are actuated by gears $m^3$, secured to shaft M², supported in proper bearings and revolved by pulley M³, driven by a band from driving-pulley $b^3$ on counter-shaft B.

M⁴ M⁴ are adjustable sleeves secured to shafts M, respectively, by set-screws. These sleeves are each provided with an annular groove in which works a shifting-sleeve, $m^4$, Figs. 1 and 4.

$M^5$ $M^5$, Figs. 2, 3, 4, and 6, are duplicate levers having their pivots $m^5$ fixed to the frame by any proper brackets. The ends of the vertical arms of these levers are provided with slot-form holes, by which each said end will have a joint-connection by means of pivot-pin $m^6$, Fig. 6, with the ears of shifting-sleeve $m^4$. The horizontal arms of these levers also are provided at their ends with slot-form holes, and are each pivoted to the coupling-head $m^7$, Fig. 6, which is secured to the vertically-moving connecting-rod $M^6$, which is pivoted to the front end of lever $M^7$. This lever has its fulcrum fixed to the cross-bar G, and its rearward arm has bearing against cam $M^8$, secured to cam-shaft. The throw portion of this cam operates lever $M^7$ to lift rod $M^6$ and operate levers $M^5$ $M^5$, so as to throw their upper ends outward, and through shifting-sleeves $m^4$ and grooved sleeves $M^4$ move the can-revolving shafts M and their attached can-clamping disks M' endwise outwardly, so as to draw said clamping-disks away from the can.

$M^9$, Fig. 5, is a spring having its upper end secured to the coupling-head $m^7$ of the horizontal arms of levers $M^5$ and its lower end to some piece fixed to the frame. When the throw-surface of cam $M^8$ has fully operated lever $M^7$, so as to move shafts M endwise apart, spring $M^9$ will operate to draw the coupled horizontal arms of levers $M^5$ downward, and thereby throw the upper ends of said levers inward or toward each other, and through shifting-sleeves $m^4$ and the grooved sleeves $M^4$ move shafts M M and the can-clamping disks M' M' toward each other and against the ends of the cans to be revolved. These shafts M M and their disks are revolved continuously, and the inward movements of these parts toward each other are so timed that the clamping of the cans is effected at the instant the carriage of the label-applying belt is started forward.

N N, Figs. 1, 4, 5, and 17, are brackets secured to the frame and provided with circular recesses $n n$, into and from which the clamping-disks M' work accordingly as shafts M are moved endwise. Projected from these recessed brackets are inclined ways $n'$, Fig. 5, through which the cans are passed to between these clamping-disks. Made in these brackets at points a little below the periphery of these clamping-disks are guide-holes $n^2$ $n^2$, into which work the can-centering pins $n^3$ $n^3$, Fig. 17. These centering-pins are located so as to have their upper sides on points of the circle of the can to be operated with, and secured to heads N'. These heads are each pivoted to the upper end of their respective levers $N^2$, which levers have their fulcrums fixed to cross-bar $N^3$, and have their lower ends provided each with a roller, which works in the equal-grooved cams $N^4$ $N^4$, Figs. 4, 6, 7, and 8. The grooves of these cams are so formed that one portion thereof will operate to move the levers so as to carry each pair of centering-pins $n^3$ $n^3$ simultaneously inward and toward each other, and another portion to operate to hold these pins inward until the can-revolving disks have been carried inward to fully clamp the can, and another portion operates to move these pins outward from each other as soon as the can has been centered and clamped, while another portion operates to hold the pins back until the can has been sufficiently revolved with the label applied and discharged from between the clamping-disks.

O, Figs. 2, 3, 4, and 14, is the can-catching apron, made of a flexible piece of material—such as leather or rubber. One end of this apron is secured to the bar $r$, attached to the head of the vertically-moving bracket O', and the other end to bar $r'$, secured to lever P; and bracket O' is secured to the vertical sliding piece $O^2$, which is guided in way $O^3$, secured to cross-bar $O^4$ of the frame. The lever P, Figs. 14 and 15, is pivoted between the ears of the head of bracket O'. Springs P' are attached at one end to the rearward arms of lever P, and at their opposite ends to arm $r^2$, connected with sliding piece $O^2$, and operate lever P, so as to raise its forward end and throw bar $r'$ toward the stationary bar $r$, and thereby give to the apron a concave form of surface, which will correspond nearly with the concavity of the can it is to catch and deliver from between the can-clamping disks, as illustrated by full and dotted lines in Fig. 14.

Figure 4:
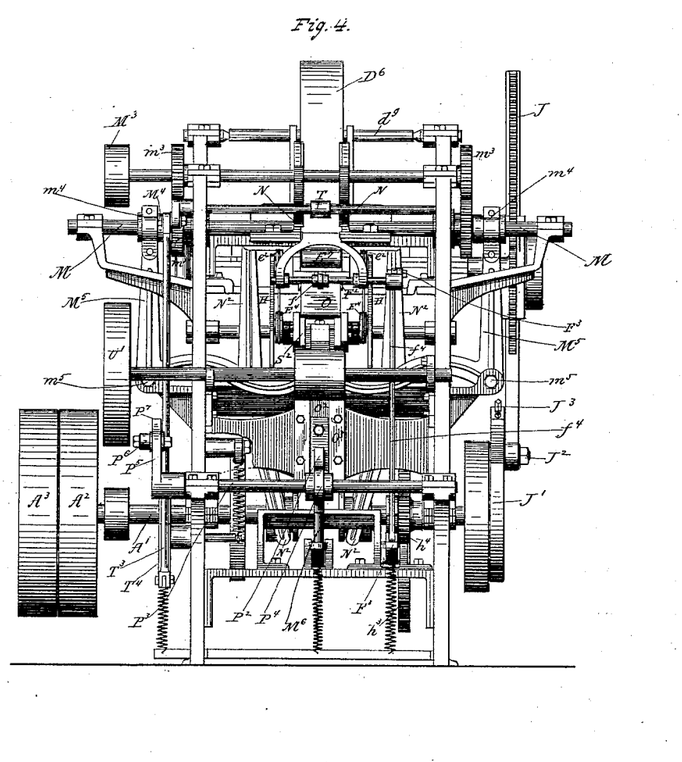
Fig. 4 is a front end elevation.

The mechanism I prefer to employ for operating lever P and apron O, to cause the latter to be lowered for discharge of the labeled can, consists of arm $P^2$, Fig. 5, fixed to sliding piece $O^2$, rock-shaft $P^3$, supported in proper bearings and having arm $P^4$ fixed thereto and beneath arm $P^2$, for operation with the same, and provided at one end with arm $P^5$, Fig. 4, provided with a wrist-pin, $P^6$, connecting-rod $P^7$, Figs. 1, 2, 3, and 4, pivoted at its forward end to the wrist-pin and at its rearward end to vibrating arm $P^8$, Fig. 2, suspended from a bracket secured to the frame and carrying at its lower end a roller, and the cam $P^9$, secured to cam-shaft $G^2$.

Cam $P^9$, Fig. 2, is made with a groove form, and the roller on vibrating arm $P^8$ works in the groove as the disk carrying the cam is revolved in direction of arrow. The portion of cam-surface 1 operates to vibrate arm P forward, and through rod $P^7$ to so move the rock-shaft $P^3$ as to lift arm $P^4$ and cause it to raise sliding piece $O^2$ to carry lever P and apron O up to a situation close to the lower side of the labeled can, as illustrated by dotted lines in Fig. 14, when springs P' will operate to raise the front end of lever P and carry the front end of apron O upward, with the body of the apron having bearing on the convex lower portion of the can as it is held between the clamping-disks. The portion of cam-surface 2 operates through arm $P^8$ and rod $P^7$ to move rock-shaft $P^3$ in a reverse direction and carry arm $P^4$ downward, and permit sliding piece $O^2$ to descend as it is pulled on by spring S, secured to the lower end of said sliding piece and with a piece fixed to the frame of the machine. After the downward movement of arm $P^4$ has progressed to a short distance it will draw down on connecting-rod $S'$, which has its upper end connected with apron-lever P at a point forward of its fulcrum, and gradually move that lever so as to carry its bar $r'$ downward and forward while the lever and its apron is being fully lowered, as illustrated by dotted lines in Fig. 14. In this downward and forward movement of the forward end of lever P the apron will be gradually stretched out from a concave form of upper surface to an inclined flat form of surface, as illustrated by dotted lines in the same figure, over which the can will freely roll, to be delivered in chute $S^2$, and thence roll into any proper conveyer. This pull of arm $P^4$ on rod $S'$ will be commenced just before the roller on surface 2 has reached point 3, and will be finished as soon as the roller has passed that point. When cam-surface 4 is moving against the roller-arm $P^8$ the rock-shaft will remain idle.

The said movements of the above-described parts are so timed in relation to the time of the rearward movement of the label-applying apron $E^7$ from beneath the can and the movements of the can-revolving shafts M M and clamping-disk $M'$ $M'$ and centering-pins $n^3$ $n^3$ in directions from each other, that the can-catching apron O will begin to rise as soon as said label-applying apron has moved back from beneath the can, and the lever P and apron O will be carried up to the can at a movement before the said can-clamping disks are moved outward from each other to release the can, and just before the centering-pins $n^3$ $n^3$ are thrust inward toward each other, so that this can-catching apron will be in situation close to the labeled can to receive the same the instant the clamping-disks release their hold on the cans. The downward movement of this can catching apron O is so timed that the instant the can is released from between the clamping-disks the sliding piece $O^2$, with apron O, will be lowered with the can on the latter, when the front limb of its lever P will be pulled fully downward and forward just before the centering-pins $n^3$ $n^3$ are thrust inward to catch a second can.

T, Figs. 1, 2, 4, and 5, is a detent arranged between ways $n'$ $n'$ in brackets N N and secured to rock-shaft $T'$, supported in proper bearings from the frame, and having arm $T^2$, which is connected by rod $T^3$ to lever $T^4$, which has its fulcrum supported from a bracket secured to the frame. The rear arm of this lever has bearing against cam $T^5$, secured to cam-shaft $A'$. The forward end of lever $T^4$ is connected with spring $t$. The projecting portion of cam $T^5$ operates to lift the front end of lever $T^4$ and so move detent T as to cause it to swing downward, while spring $t$ operates to draw the forward end of said lever downward, and thereby swing the detent upward. When the detent is vibrated to its upward position it detains the incoming can above the can having the label applied thereto and holds it from contact with the latter, so that it (the latter) may be freely revolved while the label is being applied, and the detent will be thus held until point $t'$ of cam $T^5$ strikes lever T, which will occur after the clamping-disks have been drawn apart for the discharge of the can and just before the centering-pins $n^3$ $n^3$ have been moved inward and toward each other, the movement of the cam $T^5$ being so timed as to effect these operations at the times stated.

U is a conveyer, consisting of an endless belt (or chain) carried by rollers revolved by a pulley, $U'$, driven by a band from pulley $U^2$ on shaft $A'$. This conveyer may be provided with cleats when it is to carry the labeled cans to any place of deposit in the room, or be provided with cups when the cans are to be carried to a room below or above, the cups employed being adapted for lifting or lowering the cans accordingly as they are to be carried up or down.

$U^3$ is a feed-table made with any proper form and with a middle incline way, $u$, in which the cans will roll toward ways $n'$ to be fed to between the can-clamping disks $M'$ $M'$.

The label-printing mechanism is secured to the frame and in situation relatively below the paste-box and forward of the same. This printing mechanism, Figs. 2, 3, and 5, is composed of the ink-fountain V, roller $V'$, revolving with an intermittent movement, ductor-roller $V^2$, mounted in vibrating arms $v$, pivoted to the frame, and vibrated downward by cam $v'$, mounted on shaft of roller $V^3$, and upward by spring $v^3$, to transfer ink to roller $V^3$, distributing-roller $V^4$, intermediate roller, $V^5$, inking-roller $V^6$, ink-surface dressing-roller $V^7$, cylindrical printing-form $V^8$, pressing-roller $V^9$, and paper-supporting roller $v^4$, all substantially as shown. The cylindrical form $V^8$ bears the type matter to be printed on the paper. Motion is communicated to the several parts of this printing mechanism by means of gear-wheel $h^3$, gears $v^5$ $v^6$ $v^7$, and a gear on shaft of roller $V^3$ engaging with gear $v^5$ on the shaft of printing-form $V^8$. Secured to one end of the shaft of roller $V'$ is ratchet-wheel $V^{10}$, Fig. 2, and loosely mounted on the same shaft is an arm carrying pawl $v^8$, which is operated by a connecting-rod, $v^9$, actuated by a crank connected with the shaft of roller $V^3$. These parts are so well known in printing-presses that a description of their mode of operation is not essential.

The passage of paper P is illustrated in Fig. 5, and is shown to be passed from roll C to between rollers $v^4$ and $V^9$, and $V^9$ and the printing-form $V^8$, and thence up, as illustrated, over shaft $d^5$ to wheel $D^6$, and between that wheel and revolving brushes $D^3$ $D^5$, and thence over said wheel and downwardly and forwardly to beneath bar $a'$ of tension device $D^7$, thence over roller $D^8$ and forward to beneath the elastic horizontal bar $D^9$, and forward to between the intermittent feed-roller I and pinching-wheels $j$, and between roller L and wheels $L'$ to knife K.

In some cases I employ above endless apron $E^7$ rollers $Z'$ $Z^2$, as shown in Figs. 9 and 10, for holding the paper down on said apron (when the machine is working in a room through which there is a draft of air) for preventing the cut label from being disturbed before being carried to the revolving can.

Conveyer U may be made with such a length and extended in such a direction as may be required to deposit the labeled cans into a particular place in the room, or in a room above or below, as may be preferred.

In operating this machine it is only required of the attendant to feed the cans forward one by one from table $U^3$ into ways $n'$, when they will be successively dropped down by detent T to between the revolving clamping-disks as fast as the preceding cans are delivered from the same with the labels applied.

By means of the above-described several elemental mechanisms and parts, the machine is made to operate with a plain blank strip of paper and with ink and paste to produce printed and pasted labels cut with uniform lengths, and also operate with the cans to successively receive the same from a table and automatically center, clamp, and revolve the same, and carry the pasted labels successively to the revolving cans and apply the same to their periphery in a proper manner and discharge the same from the machine to a conveyer, which can be made to deposit the cans in the same room or a room above or below, as preferred.

What I claim, and desire to secure by Letters Patent, is—

1. The combination, with the paper-supporting wheel $D^6$, of paste-box D, revolving paste-wheel $D^2$, revolving paste-brush $D^3$, and the tension device $D^7$, substantially as set forth.

2. The combination, with the paper-supporting wheel $D^6$ and pasting-wheel $D^2$, of revolving pasting-brush $D^3$, mounted in bearings secured to the adjustable arms $d^4$, substantially as set forth.

3. The combination, with wheel $D^6$, which supports the paper while being pasted, and tension device $D^7$, of roller $D^8$ and elastically-supported slotted bar $D^9$, arranged rearward of the intermittently-revolving feed-roller I, substantially as set forth.

4. The combination and arrangement, with the paper-roll shaft C, revolving paper-supporting wheel $D^6$, and the pasting mechanism above described, of printing mechanism, substantially as above described, intermediate between the said roll-shaft and the said wheel, substantially as set forth.

5. The combination and arrangement, with the paper-supporting wheel $D^6$, tension device $D^7$, supporting-roller $D^8$, and slotted elastic bar $D^9$, of the intermittently-revolving feed-roller I and the pinching-rollers $j\,j$, mounted on a shaft supported in notched bearings and actuated by gear $j'$, revolved by gear secured to the shaft of the feed-roller, substantially as set forth.

6. The combination, with revolving paper-supporting wheel $D^6$ and paste-roller $D^2$, revolving in paste-box D, of pasting-brush $D^3$, having bearings in adjustable arms $d^4$, provided with slots and secured to shaft $d^5$ by set-screws $d^6$, substantially as set forth.

7. The combination, with feed-roller I and its coacting pinching-rollers $j\,j$, of revolving eccentric $J'$, reciprocating rack J, pinion $I^3$, loosely mounted on shaft $I'$ of said feed-roller, and disk $I^4$, secured to said shaft and provided with the internal clutched mechanism above described, and which is connected with said pinion and brake $I^6$, substantially as and for the purposes set forth.

8. The combination, with the above-described pasting mechanism, intermittently-revolving feed-roller I, and its co-acting pinching-rollers $j\,j$, tension device $D^7$, and intermittently-reciprocating knife K, of the continuously-revolving endless belt $E^7$, and the mechanism above described for giving the endless belt $E^7$ a reciprocating movement while it is revolving to and from the knife, all substantially as and for the purposes set forth.

9. The combination, with the pasting mechanism above described, tension device $D^7$, intermittent feeding-roller I, and its coacting pinching-rollers $j\,j$, intermittent reciprocating knife K, and the continuously-revolving endless belt $E^7$, of the revolving cam-disk $H^3$, above-described connecting-rod $H'$, levers H, having their fulcrums on shaft $e$, and connected with the shaft of one of the rollers of the endless belt, substantially as and for the purposes set forth.

10. The combination, with the pasting mechanism above described, tension device $D^7$, intermittent feed-roller I and its coacting pinching-rollers $j\,j$, intermittently-reciprocating knife K, and endless belt $E^7$, which is revolved continuously and carried intermittently in a reciprocating manner to and from said knife, of the can-revolving disks $M'\,M'$ and the mechanism above described operating said disks for closing and releasing the can, all substantially as and for the purposes set forth.

11. The combination, with the revolving can-clamping device $M'\,M'$ and the endless apron $E^7$, which is revolved continuously and is carried in a reciprocating manner, and the cutting device K, of the mechanism above described for raising the forward end of the revolving apron when approaching said can-clamping device and lowering the same when it is moving backward toward said cutting device, substantially as and for the purposes set forth.

12. The combination of the revolving endless label-applying apron, carriage supporting said apron as it is being continuously revolved, and the jointed ways F F', with mechanism, above described, to move the said apron and its carriage alternately to and from the above-described mechanism which clamps the can, and mechanism, above described, to alternately raise and lower the forward ends of the jointed ways for carrying the apron up to the periphery of the revolving can and down from the same, substantially as and for the purposes set forth.

13. The mechanism above described for giving to the endless label-applying belt or apron a reciprocating movement while being revolved, formed by the combination, with said apron, carriage $E^5$, jointed ways F F', vibrating levers H, and connecting-rod H', of revolving cam $H^4$ and an arm pivoted to a fixed piece and provided with a roller arranged to connect said cam with said connecting-rod, substantially as and for the purposes set forth.

14. The mechanism above described for raising the label-applying apron up to the lower side of a revolving can as it approaches said can, consisting of the combination, with said apron and the carriage carrying the rollers of the same, of the pivoted ways F and F', and rock-shaft $F^2$, connecting-rod $f^4$, connected at one end to an arm on said rock-shaft and at its other end to lever $F^3$, operating with revolving cam G', and spring $g$, substantially as and for the purposes set forth.

15. The mechanism above described for revolving the can, consisting of the combination, with revolving shafts M M, gears $m'$ $m'$, supported in proper bearings and having each a sleeve within which said revolving shaft M moves longitudinally, feathers secured to shaft M and engaging with said gears so as to revolve said shafts, and clamping-disks M' M', of shaft $M^2$, provided with gears $m^3$ $m^3$ and revolved by a pulley, substantially as and for the purpose set forth.

16. The combination, with disks M' M', secured to shafts which are revolved continuously and are moved toward and from each other alternately, of recessed ways $n'$ $n'$, leading to the space or room between said disks, substantially as and for the purposes set forth.

17. The combination, with the shafts of clamping-disks M' M', and gears which will permit said shafts to be moved longitudinally and also revolve the same, of mechanism, above described, operating both said shafts simultaneously for moving said disks toward and from each other alternately, substantially as and for the purposes set forth.

18. The combination, with the revolving shafts of the can-clamping disks, and sleeved gears with feathers which will rotate said shafts and permit their longitudinal movement, of adjustable sleeves $M^4$, levers $M^5$, connecting-rod $M^6$, lever $M^7$, cam $M^8$, and spring $M^9$, substantially as and for the purposes set forth.

19. The combination, with brackets N, provided with recesses $n$, of revolving can-clamping disks, which are moved into and out from said recesses while revolving, and can-centering pins $n^3$ $n^3$, and mechanism, above described, which will thrust said centering-pins inward past the line of the vertical plane of the face-surface of said disks as soon as a can is fully delivered from between said disks and withdraw said pins as soon as a can has been clamped between them, for the purposes set forth.

20. The combination, with brackets N N, provided with holes $n^2$ $n^2$, situated at the peripheral line of the clamping-disks, of can-centering pins $n^3$ $n^3$, levers $N^2$ $N^2$, and revolving cams $N^4$ $N^4$, substantially as and for the purposes set forth.

21. The combination, with ways $n'$ $n'$, of detent T, arranged to vibrate within said ways to a point to permit cans to descend in the same, and mechanism, above described, for operating said detent, revolving disks and mechanism, above described, which will cause them to clamp the can and release the same while said disks are revolving, can-centering pins $n^3$ $n^3$, and the above-described mechanism for operating the said pins, substantially as and for the purposes set forth.

22. The combination, with revolving clamping-disks, of apron O, bracket O', and lever P, and mechanism, above described, which will operate to raise said apron up to the periphery of the can clamped between said disks at about the time the can is being released and lower said apron and throw it into a downwardly-inclining position, substantially as and for the purposes set forth.

23. The combination, with bracket O' and lever P, carrying a can-catching apron, of vertically-moving piece $O^2$, provided with arm $P^2$, rock-shaft $P^3$, provided with arms $P^4$ and $P^5$, wrist-pin $P^6$, connecting-rod $P^7$, and arm $P^8$, pivoted to the frame and provided with a roller working in a revolving cam, $P^9$, having surfaces described, substantially as and for the purposes set forth.

24. The combination, with pivoted lever P, and bracket O', having a can-catching apron at their upper ends, and spring P', connecting their opposite ends, a vertically-moving shaft operated by mechanism to elevate and depress said apron, and the chute $S^3$, of mechanism, above described, which will operate to draw downwardly and forwardly the arm of said lever, which connects with said apron for the delivery of the can into chute $S^3$, substantially as set forth.

25. The combination, with bracket O', lever P, apron O, spring P', and vertical shaft $O^2$, provided with arm $P^2$, of connecting-rod S', having connection with lever P, and a rock-shaft arm operated by cam $P^9$, above described, and connecting-rod between said cam and rock-shaft, all substantially as and for the purposes set forth.

26. In a can-labeling machine, the combination, with the revolving can-clamping disks provided with the devices described for centering the can and mechanism described for detaining the cans above from entering between said disks before the labeled can is discharged therefrom, of mechanism, above described, to deliver the labeled can from between the disks to a chute, and the conveyer U, substantially as and for the purposes set forth.

FEODOR HIRSCH.

Witnesses:
ALEX. SELKIRK,
REUBEN W. DREW.